United States Patent [19]
Wilson

[11] 3,848,505
[45] Nov. 19, 1974

[54] HOLE PUNCHING FASTENER FOR SHEET METAL

[76] Inventor: Floyd Leroy Wilson, P.O. Box 203, Manhattan, Kans. 66502

[22] Filed: Jan. 16, 1973

[21] Appl. No.: 324,159

[52] U.S. Cl. ............................... 85/19, 85/21
[51] Int. Cl. ............................... F16b 15/06
[58] Field of Search .................. 85/11, 30, 19, 21

[56] References Cited
UNITED STATES PATENTS

| | | | |
|---|---|---|---|
| 427,436 | 5/1890 | Merrill | 85/19 |
| 882,953 | 3/1908 | Miner | 85/19 |
| 1,141,428 | 6/1915 | Simpson | 85/21 |
| 1,267,851 | 5/1918 | Crosby | 85/19 |
| 1,793,185 | 2/1931 | McChesney | 85/11 |
| 2,371,935 | 3/1945 | Van Akkeren | 85/11 |

FOREIGN PATENTS OR APPLICATIONS

| | | | |
|---|---|---|---|
| 306,116 | 6/1955 | Switzerland | 85/19 |

*Primary Examiner*—Edward C. Allen
*Attorney, Agent, or Firm*—Berman, Bishoff & Platt

[57] ABSTRACT

A self-penetrating rivet for fastening superimposed pieces of sheet metal together. The rivet has a generally I-shaped shank with sharp cutting edges at its end forming opposing inclined lugs in the sheet metal pieces when the shank is driven through the superimposed pieces. The shank has a thickened intermediate portion defining projections on the opposite faces of its web member, defining abutments which lockingly cooperate with the opposing inclined lugs.

6 Claims, 7 Drawing Figures

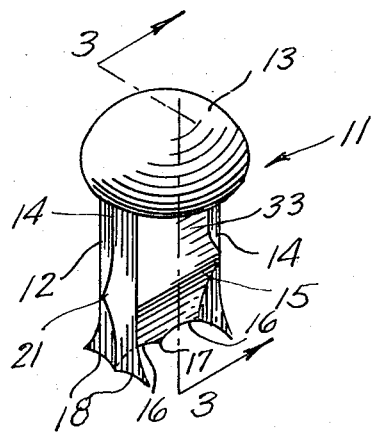
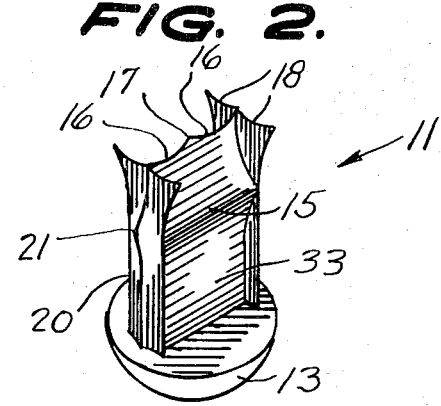
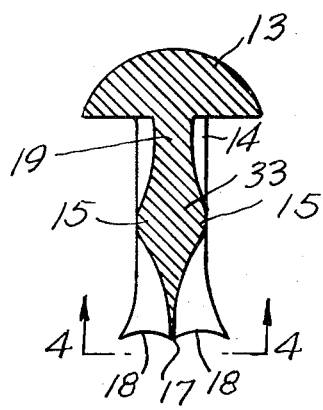
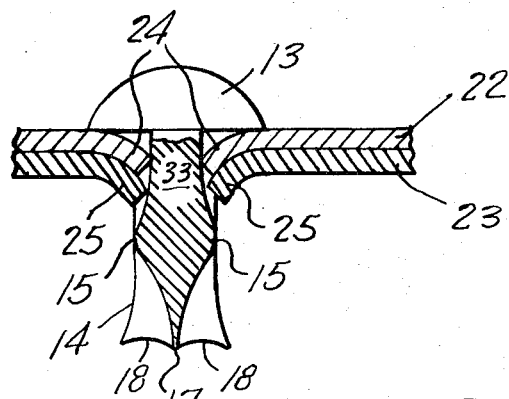
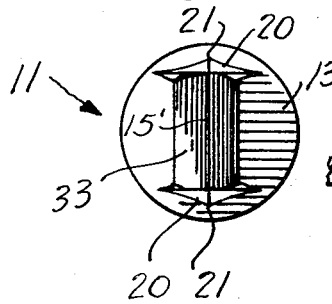
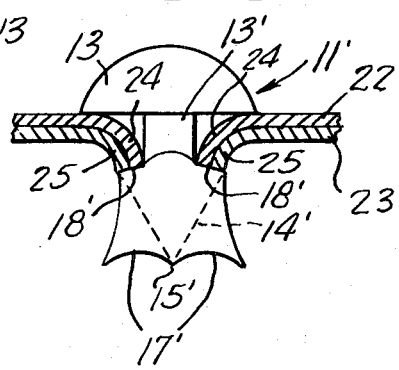
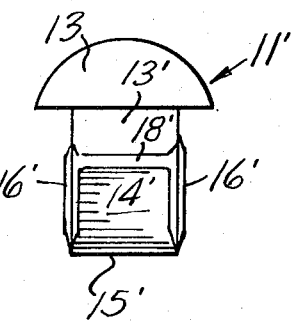

HOLE PUNCHING FASTENER FOR SHEET METAL

This invention relates to fasteners of the rivet type, and more particularly to fasteners of the type having cutting edges so that the fastener punches its way through the pieces to be secured together as the fastener is driven.

A main object of the invention is to provide a novel and improved self-penetrating fastener for fastening superimposed pieces of sheet metal, or the like, together, the fastener being relatively simple in construction, being easy to install, and being provided with built-in locking means which securely maintains it in position after it has been driven.

A further object of the invention is to provide an improved self-penetrating rivet for fastening superimposed pieces of sheet metal or similar material together, the rivet being inexpensive to manufacture, having a positive locking action, and being usable without requiring the pieces to be fastened together to be previously perforated.

A still further object of the invention is to provide an improved self-penetrating rivet which is so formed that it creates opposing locking lugs in the pieces of material to be secured together and which is provided with abutment means lockingly cooperating with the opposing locking lugs so that the fastener is securely retained in its driven position.

Further objects and advantages of the invention will become apparent from the following description and claims, and from the accompanying drawings:

FIG. 1 is a perspective view showing one form of an improved self-penetrating rivet constructed in accordance with the present invention, as viewed from above.

FIG. 2 is a perspective view of the fastener of FIG. 1, shown in inverted position.

FIG. 3 is a transverse vertical cross-sectional view taken substantially on line 3—3 of FIG. 1 and being somewhat enlarged in scale.

FIG. 4 is a bottom view of the fastener of FIGS. 1, 2 and 3, said view being taken substantially on line 4—4 of FIG. 3.

FIG. 5 is a cross-sectional view taken through two pieces of superimposed sheet metal which are secured together by means of a fastener such as that illustrated in FIGS. 1 through 4 and illustrating the manner in which the thickened web portion of the shank of the fastener lockingly cooperates with opposing inclined lugs formed in the pieces of sheet metal to hold the fastener in its driven position.

FIG. 6 is a cross-sectional view similar to FIG. 5 but illustrating a different form of self-penetrating rivet according to the present invention.

FIG. 7 is a side elevational view of the fastener shown in FIG. 6.

Referring to the drawings, 11 generally designates one form of an improved self-penetrating rivet according to the present invention. The rivet 11 comprises a shank member 12 provided with an enlarged driving head 13, the shank member having a generally I-shaped cross-section defining a web member 33 and respective flange members 14, 14 at the opposite side edges of said web member 33. The web member is provided with a thickened intermediate portion to define opposite locking ridges, or shoulders 15, 15 for a purpose presently to be described, and the web member tapers downwardly from said ridges 15, 15 and is formed at its bottom end with arcuate downwardly concave sharp cutting edges 16, 16 forming a sharp point 17 therebetween, as shown in FIG. 2. The flanges 14, 14 flare downwardly in width below the ridges 15, 15 and are formed at their bottom ends with downwardly arcuately concave sharp cutting edges 18, 18 on opposite sides of the bottom cutting edge of web member 33. As shown in FIG. 3, the web member 33 is reduced in thickness beneath head 13 so as to define a reduced neck portion 19 between the flanges 14, 14 immediately beneath head 13, the opposite faces of the upper portion of web 33 diverging downwardly toward the crest of the ridges 15, 15. Similarly, the opposite faces of the lower portion of web 13 below the ridges 15, 15 converge downwardly toward the cutting edges at the bottom end of the web.

The outside faces of the flange members 14, 14 are formed with vertical ridges, shown at 20, 20, the crests of said ridges diverging downwardly from beneath head 13 toward points 21, 21 located approximately at the same level as the crests of the ridges 15, 15. The crests of the ridges 20, 20 of side flanges 14, 14 converge downwardly from the points 21, 21 toward the bottom cutting edges of the flanges.

In using the rivet, the rivet is driven through a pair of superimposed pieces of sheet metal, such as the pieces shown at 22 and 23 in FIG. 5, by impact applied to the head 13, the cutting edges of shank 12 forming a I-shaped slit in each of the pieces and the thickened central portion of web 13 acting to downwardly deform the resultant opposing pairs of lugs 24, 24 and 25, 25 formed in the sheet metal pieces 22 and 23, in the manner illustrated in FIG. 5. When the rivet is driven to its final position, such as that shown in FIG. 5, the lugs 24, 24 and 25, 25 are inclined downwardly and inwardly and abut the upwardly convergent surfaces of the web 33 above the transverse portions 15, 15. Thus, the lugs 24, 24 and 25, 25 are lockingly interengaged with said upwardly convergent sloping surfaces and thereby wedgingly hold the fastener in its driven position. Thus, the fastener may be installed in a very simple manner, namely, by merely driving it through the superimposed sheet metal pieces 22 and 23, for example, by a single blow of a hammer or similar impact tool.

In the form of the invention illustrated in FIGS. 6 and 7, the improved self-penetrating rivet is designated generally at 11' and comprises a shank 13' of rectangular cross-section at its upper neck portion and of enlarged I-shaped cross-section at its lower portion. Said lower portion comprises a downwardly tapered web 14' terminating in a sharp cutting edge 15' and has transversely extending side flanges 16', 16' which flare downwardly in width and which are formed at their bottom ends with downwardly concave arcuate cutting edges 17', 17' located on opposite sides of the web cutting edge 15'. The enlarged lower portion of the shank defines a pair of upwardly facing opposing locking shoulders 18', 18' which lockingly cooperate with the opposed pairs of lugs 24, 24 and 25, 25 formed in the superimposed pieces of sheet metal 22 and 23 after the rivet has been driven therethrough in the manner described previously in connection with the form of the invention shown in FIGS. 1 through 5. Thus, the improved rivet of FIGS. 6 and 7 is provided with a striking head 13, as in the first-described form of the invention, and in installing the rivet, it is merely driven through the superimposed sheet metal pieces 22 and 23 by means of a suitable hammer or other appropriate impact tool. When thus driven, the lugs formed by the I-shaped cutting edge of the rivet are deformed downwardly and lockingly engage on the upwardly facing locking shoulders 18', 18' in the manner illustrated in FIG. 6, thereby securely holding the rivet in its driven position and firmly fastening the two pieces 22 and 23 together in superimposed relationship.

In the form of the invention shown in FIGS. 6 and 7, the outside faces of the flange members 16', 16' are formed with outwardly facing vertical ridges which converge downwardly at the lower ends of the flange members, as in the previously described form of the invention.

While certain specific embodiments of an improved self-penetrating rivet for fastening superimposed pieces of sheet metal or the like, together have been disclosed in the foregoing description, it will be understood that various modifications within the spirit of the invention may occur to those skilled in the art. Therefore, it is intended that no limitations be placed on the invention except as defined by the scope of the appended.

What is claimed is:

1. A self-penetrating rivet for fastening superimposed pieces of sheet metal together by driving an I-shaped slit therein and downwardly deforming portions of the sheet metal sheets to form locking lugs, comprising a shank member provided with an enlarged head, said head having a flat, horizontal bottom and said shank depending centrally from said bottom, said shank member further having upper and lower portions separated by an intermediate portion, the upper portion having a depth approximately equal to the total depth of the locking lugs to be formed in the sheets of metal, at least the lower and intermediate portions of said shank member having a generally I-shaped cross section defining a web member and flange members at the opposite side edges of said web member, the lower ends of the web member and flange members being shaped to define cutting edges, the cutting edge of each flange member being downwardly concavely arcuately curved on opposite sides of the web member, the web member in said intermediate portion of the shank member being formed to define upwardly facing locking shoulders on its opposite faces to lockingly engage under portions of the locking lugs formed on the superimposed pieces of sheet metal when the shank member is driven therethrough so that the lower portion of the shank member is completely below the locking lugs, whereby to clamp the locking lugs between the locking shoulders and the flat horizontal bottom of said head on both sides of said web member.

2. The self-penetrating rivet of claim 1, and wherein the lower end of each flange member is flared downwardly and outwardly in width.

3. The self-penetrating rivet of claim 1, and wherein the opposite faces of the web member converge downwardly from said locking shoulders.

4. The self-penetrating rivet of claim 3, wherein said upper portion of the shank member has a rectangular cross-section whose opposite faces are substantially vertical, and wherein said locking shoulders in the intermediate portion of the shank member comprise outwardly and upwardly facing abutments which are nearly parallel to the horizontal bottom of the enlarged head.

5. The self-penetrating rivet of claim 4, and wherein the side edges of each flange member diverge downwardly from each other starting at said abutment shoulders.

6. The self-penetrating rivet of claim 1, and wherein the outside faces of the flange members are formed with vertical ridges, the crests of said ridges converging downwardly at the lower ends of the flange members.

* * * * *